United States Patent [19]
Altmayer et al.

[11] Patent Number: 5,155,693
[45] Date of Patent: Oct. 13, 1992

[54] SELF DOCUMENTING RECORD OF INSTRUMENT ACTIVITY AND ERROR MESSAGES STAMPED WITH DATE AND TIME OF OCCURRENCE

[75] Inventors: Lee H. Altmayer, Hockessin, Del.; Christopher M. Wurm, Landenberg, Pa.

[73] Assignee: Hewlett-Packard Company, Palo Alto, Calif.

[21] Appl. No.: 577,966

[22] Filed: Sep. 5, 1990

[51] Int. Cl.⁵ .................. G06F 15/21; G06F 11/34
[52] U.S. Cl. .................. 364/550; 340/679; 346/33 R; 364/419; 364/500
[58] Field of Search ............ 364/550, 551.01, 500, 364/496, 188, 191, 419, 481, 483; 340/679, 721, 825.06; 346/33 MC, 33 R

[56] References Cited

U.S. PATENT DOCUMENTS

| | | | |
|---|---|---|---|
| 4,396,977 | 8/1983 | Slater et al. | 364/188 |
| 4,535,409 | 8/1985 | Jindrick et al. | 364/481 |
| 4,654,588 | 3/1987 | Munday | 364/483 X |
| 4,701,858 | 10/1987 | Stokes et al. | 364/483 |
| 4,718,025 | 1/1988 | Minor et al. | 364/550 |
| 4,805,089 | 2/1989 | Lane et al. | 364/188 |
| 4,815,014 | 3/1989 | Lipner et al. | 364/550 |
| 4,858,152 | 8/1989 | Estes | 364/550 |
| 4,907,167 | 3/1990 | Skeirik | 364/550 X |
| 4,941,113 | 7/1990 | Dundics et al. | 364/551.01 |
| 4,967,381 | 10/1990 | Lane et al. | 364/551.01 |
| 4,975,865 | 12/1990 | Carrette et al. | 364/500 X |

FOREIGN PATENT DOCUMENTS

81/02799 10/1981 World Int. Prop. O. ...... 364/551.01

Primary Examiner—Kevin J. Teska

[57] ABSTRACT

A method of creating a self-documenting logfile which records the status and operation of a substantially computer-controlled device. The method comprises the steps of accepting input commands from a user for controlling the device status and operation; monitoring the device characteristics; detecting deviations in the device status, user inputs, and procedural steps in the device's operation; writing these detected events to the logfile with the date and time of which the detected event occurred; and retrieving the logfile upon user demands for review of the logfile. In order to comply with good laboratory practices (GLP), the method additionally comprises steps for verifying the user input commands by determining the acceptability of the input commands, detecting inadvertent alteration to the logfile and testing the validity of the logfile for invalid data. Steps for providing an enciphering key within the event lines which comprise the logfile in order to detect tampering are also disclosed.

22 Claims, 10 Drawing Sheets

```
22 JUL 90  02:51 PM                                                            PAGE 1
LOGFILE: C:\HPCHEM\CURRENT.LOG

HP7680A LOG FILE

COMMAND OR EVENT                                                   TIMESTAMP

HP7680A APPLICATION STARTED SUN JUL 22 1990 14:24:47
   OPEN METHOD SHORTIE.EXT SUN JUL 22 1990 14:25:38
   CLOSE EXTRACTION CHAMBER                        SUN JUL 22 1990    14:25:44
   EXTRACTION STEP: 1                                                 14:28:15
   DEPRESSURIZE                                                       14:36:34
   RINSE SUBSTEP 1                                                    14:37:59
   NO VIAL IN TURRET LOCATION 1 1 SUN JUL 22 1990 14:44:51
   PLACE VIAL IN TURRET POSITION 1 OK SUN JUL 22 1990 14:46:11
   RINSE SUBSTEP 1                                                    14:46:13
   OPEN EXTRACTION CHAMBER                                            14:50:58
```

Fig. 8

SELF DOCUMENTING RECORD OF INSTRUMENT ACTIVITY AND ERROR MESSAGES STAMPED WITH DATE AND TIME OF OCCURRENCE

RELATED APPLICATION DATA

This application is related to the subject matter of commonly assigned co-pending U.S. patent application Ser. No. 487,548 entitled "Image-oriented Method and Apparatus for Computer Control of Mechanical Devices", filed on Mar. 2, 1990.

BACKGROUND OF THE INVENTION

The present invention relates to methods of creating a self-documenting logfile of events which occur during the operation of a computer-controlled mechanical device, and more specifically, to methods for verification and detection of alterations to the self-documenting logfile.

Modern advances in computer related technologies have provided application programs which allow users of mechanical devices to operate the devices via computer control. Such computer control has numerous advantages including time savings and a general reduction in operational error.

One example of such an application program is disclosed in the above-referenced co-pending patent application for image-oriented computer control of a supercritical fluid extractor. A partially schematic supercritical fluid extractor is shown in FIG. 1. Typically, the extractor 10 will include the following components: an analyte trap 12, an extraction chamber 13, extraction fluids 14, fluid delivery means 15, fraction output means 16, a keyboard 17, and rinse solvents 18. The extractor 10 is electrically interfaced to a computer 2 which runs the image-oriented extractor applications software.

The image-oriented applications program, in brief, displays an image depicting the supercritical fluid extractor on a monitor 8 and accepts instruction inputs from the user pertaining to the desired function to be performed, via a keyboard 4 or mouse 6. This input triggers the application programs to display status information related to the functional component selected by the user. The applications program then permits the user to modify the extractor's operation or status accordingly.

Initially, the extractor 10 is displayed on the monitor 8 as shown in FIG. 2. The user then moves a cursor (not shown) to one of the extractor's functional components and selects this component by pressing a button on the mouse. For instance, if the user selects the extraction chamber functional component 13 in FIG. 1, a new screen, depicted in FIG. 3, will be displayed providing the user with the extraction chamber status. The user may modify the extraction chamber parameters, for example by changing the temperature setting 64. This may be accomplished by moving the cursor to the temperature setting 64, pressing a button on the mouse and entering the desired temperature setting. Alternatively, the user may select the increment arrow 61 or the decrement arrow 62, causing the temperature setting 64 to change by 1° C. in the corresponding direction.

As will be appreciated by those of ordinary skill, for the operational status of the mechanical device or its functional components to be accurately displayed, it will be necessary that an appropriate sensor be present in the mechanical device. Such sensors detect a given condition, such as temperature, and convey this information to a computer or other processor so that it may be displayed on a display screen. Examples of suitable sensors are pressure sensors, optical sensors of quantifiable parameters such as absorption, transmittance and fluorescence, and electrodes which detect changes in, for example, pH and electric potential.

Likewise, for modification of an operating parameter to be implemented in the operation of the mechanical device, an actuation means must be present in that mechanical device to drive the device to the new, selected operational status. In the supercritical fluid extractor described above with reference to FIGS. 1-3, for example, drivers change fluid flow, dispense fluids, and change valve positions.

As further understood by those of ordinary skill, most devices have a performance standard or other routine against which results are measured. For example, most analytical laboratory testing must conform to Good Laboratory Practices (GLP) and general-laboratory record keeping requirements. Typically, these requirements are satisfied by hand recording data or by manually updating a database containing each operation performed by the computer-controlled mechanical device. The problems encountered using these techniques are well known. For instance, potentially valuable information might not be recorded due to a failure to update the record. The resulting record might be inaccurate as a result of recording information incorrectly, or the record or database could be tampered with inadvertently.

Therefore, there is a need for a self-documenting method to record the status and user instructions for a computer-controlled mechanical device in order to comply with standards such as GLP and general laboratory record keeping requirements, so that a chronological history may be reviewed to verify the accuracy of the device's operation and to determine whether the records may have been affected by accidental or inadvertent erasure or tampering attempts.

SUMMARY OF THE INVENTION

The present invention provides methods which fulfill the need for a self-documenting method to record the status and user instructions for a computer-controlled mechanical device in order to comply With standards such as GLP and general laboratory record keeping requirements. More specifically, the claimed methods provide a self-documenting logfile which detects errors in the device's operation and deviations in the status of the device as well as accidental or inadvertent erasure of the logfile or tampering attempts.

The self-documenting logfile records the status and operation of a substantially computer-controlled mechanical device which has one or more application programs. The method for creating the logfile comprises accepting input commands from a user for controlling the status and operation of the device; monitoring the status and operation of the device; detecting events which may include deviations in the device status, user input commands, or steps in the operation of the device; writing these detected events to the logfile together with the date and time at which the detected event occurred, thereby creating an event line. The present invention retrieves the logfile upon user demand and verifying the user input commands by determining the acceptability of the input commands and detecting inadvertent alteration to the logfile. In a preferred embodiment, a start up event line is written to the logfile in order to indicate which application program has been selected by a user. An error message informs the user if the logfile cannot be created. If the logfile cannot be opened during the operation of the application program, the user is informed of the condition and must acknowledge the condition so that a new logfile can be created with an alternate start up message indicating that the application program started at an unknown time and that some event lines may have been lost.

A logfile is tested for validity by examining its contents whether less than a minimum number of characters have been written to the logfile, whether the start up event line is absent from the logfile, whether a maximum number of characters have been exceeded in an event line and whether impermissible characters or non-printable characters are present in the logfile. If any of these conditions are found then the user is informed that the logfile or the data within it is invalid when the logfile is retrieved.

These and other advantages are accomplished by the present invention, which is particularly pointed out in the appended claims and is described and illustrated in connection with the accompanying drawings.

Methods of providing an enciphering key within the event lines which comprise the logfile in order to detect tampering are also disclosed. Preferably, an enciphering key is generated which permits the detection of tampering attempts. The enciphering key is created by modifying the event lines to have a regular characteristic, and the detection of tampering attempts comprises the step of determining if any event lines do not possess the regular characteristic. Thus, that each event line may be modified, for example, to contain the same number of characters, an even number of characters, an odd number of characters, or to contain one or more particularly selected characters. In a preferred embodiment, the step of modifying the event lines is changed on a regular basis, such as over time or upon the creation of a specific number of lines, to further defeat tampering attempts. The resulting encipherment exists on each line and extends across all the lines of the logfile. This effectively renders the entire file enciphered by a key which is distributed or embedded throughout the file, thus making detection of a minute alteration possible, although in this instance the specific site or particular line on which the modification occurs may not be readily determined.

BRIEF DESCRIPTION OF THE DRAWINGS

The present invention will be better understood, and its numerous advantages will become apparent by reference to the following detailed description of the invention when taken in conjunction with the following drawings, in which:

FIG. 8 illustrates a sample logfile documenting an example of normal extractor activity with a missing vial error.

DETAILED DESCRIPTION OF THE INVENTION

Figure 1:
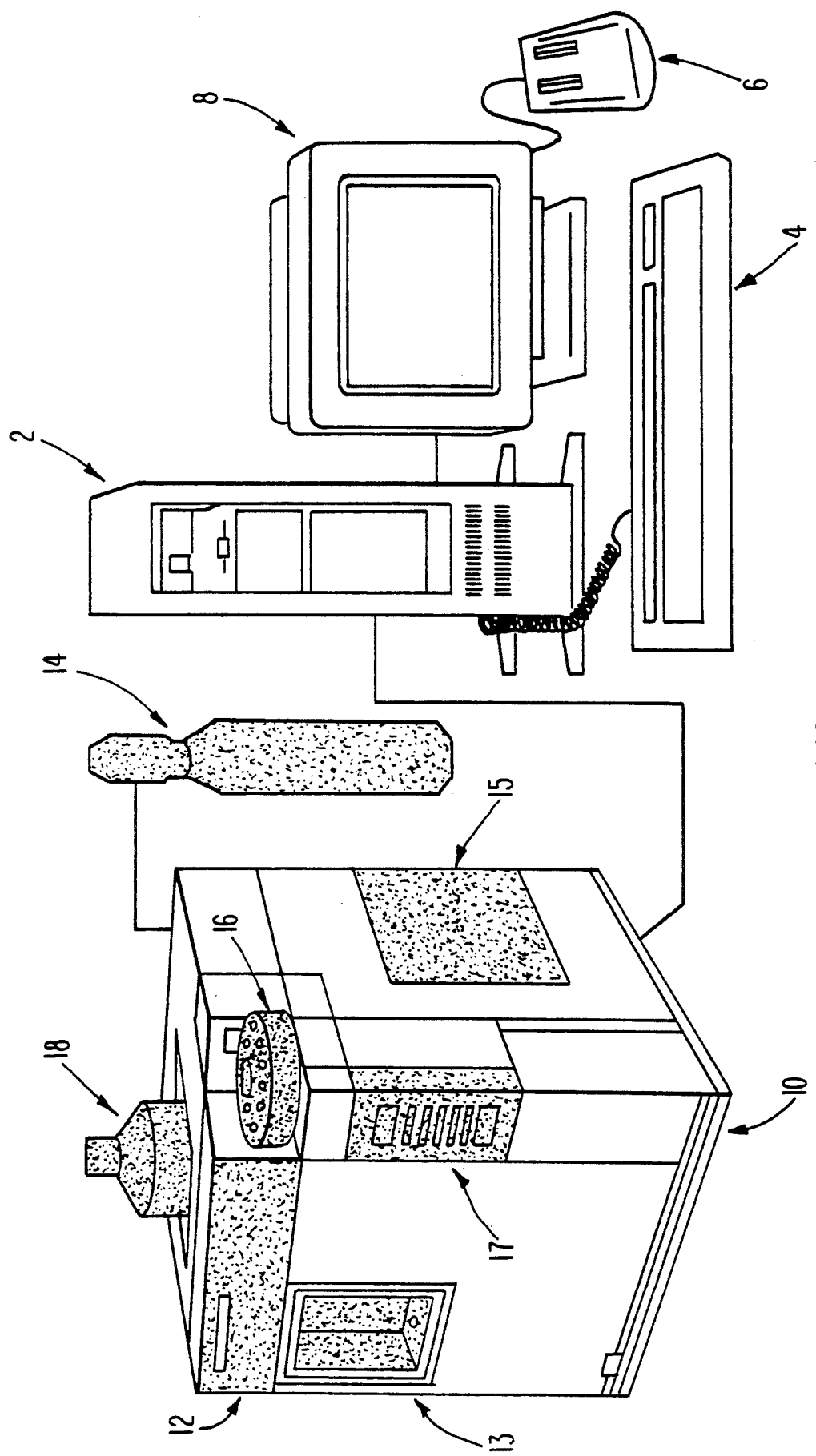
FIG. 1 is a partially schematic, perspective view of an apparatus for computer control of a supercritical fluid extractor.
Figure 2:
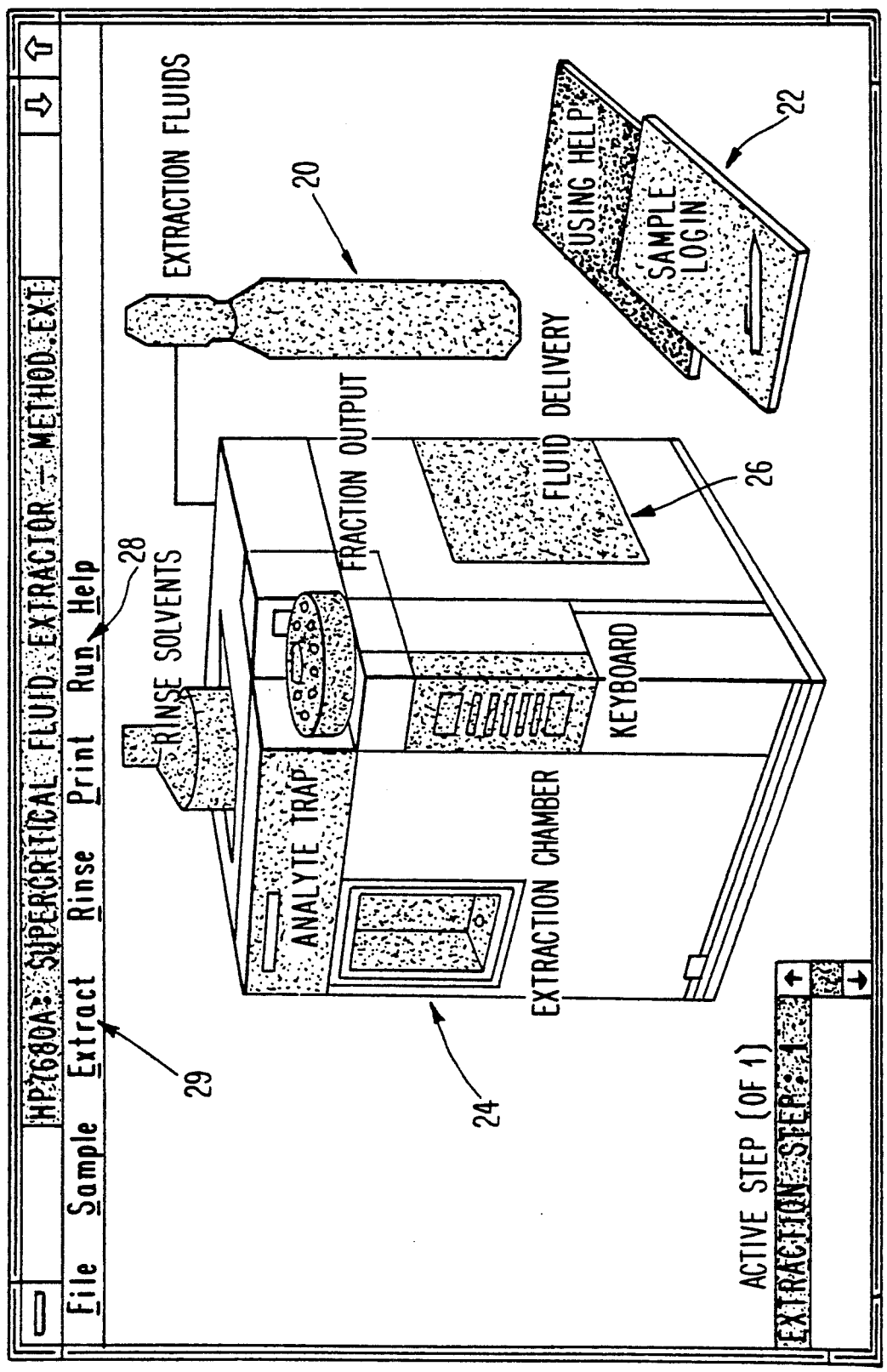
FIG. 2 illustrates a computer screen displaying the functional components of a supercritical fluid extractor.
Figure 3:
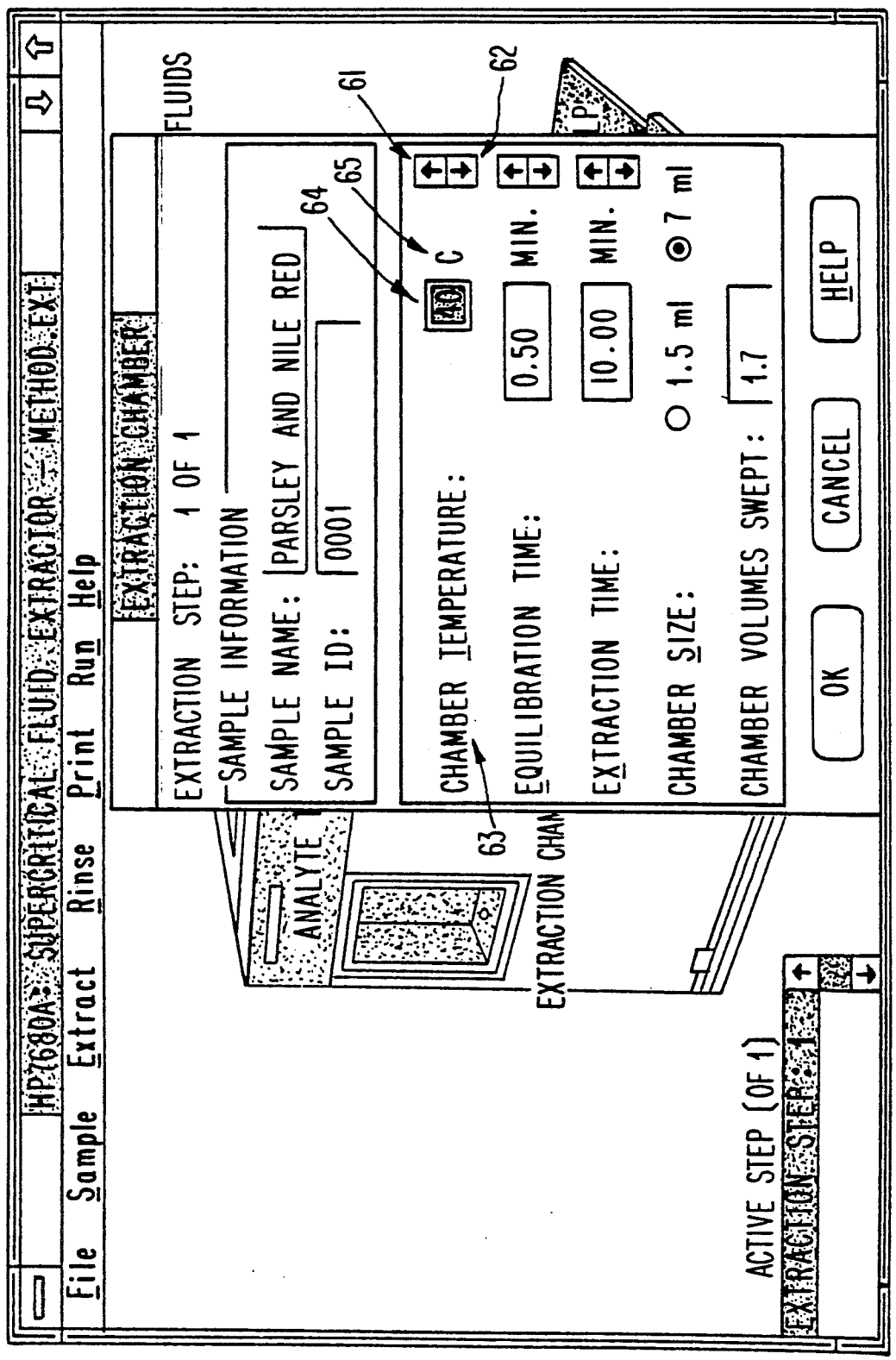
FIG. 3 illustrates a computer screen displaying status and operational parameters for the extraction chamber of a supercritical fluid extractor.
Figure 4:
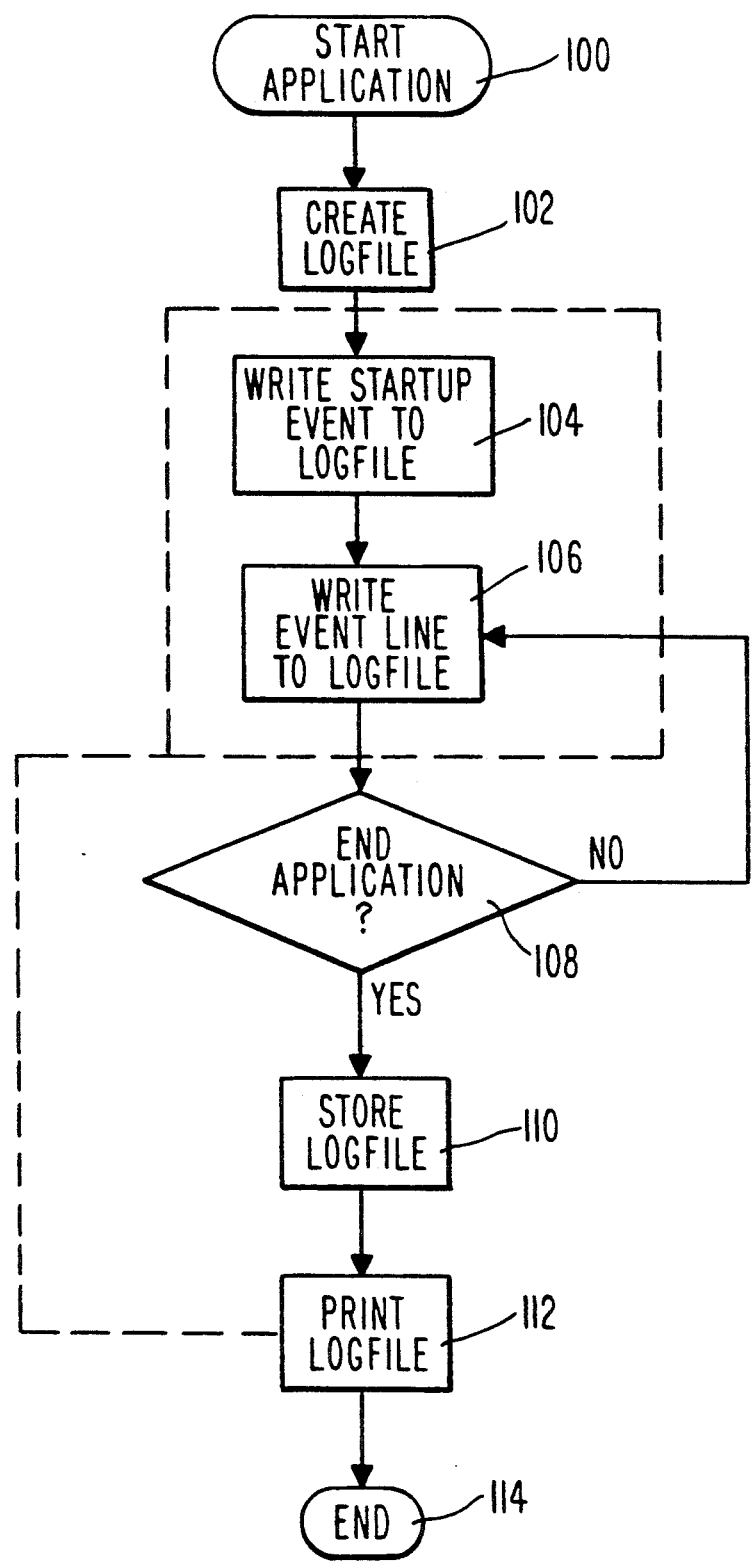
FIG. 4 is a functional flow diagram of the self-documenting logfile software.

Referring to FIG. 4, a functional flow diagram of the self-documenting logfile software is shown. A mechanical device such as the extraction instrument described above is substantially controlled by a computer program, referred to as the "application program." Once a user initiates an application program, shown in FIG. 4 at step 100, the computer creates a file called a logfile at step 102. Once this file has been created, a start up event line is written to the logfile indicating which application program has been selected at step 104.

As the application program runs, important events are summarized as a phrase. Important events are typically those associated with the status of the device and the operation of the device. For instance important events in an extraction instrument might include "closing the chamber door" on the instrument, one of the numbered steps in the extraction instrument application, or an error message. Table 1 sets forth other examples of such messages.

TABLE 1

IDERROR54. "Place vial in turret position %d"
IDERROR70. "Place thimble in extraction chamber"
IDERROR71. "Close extraction chamber door"
IDERROR72. "Fix underpressure condition"
IDERROR73. "Fix low cryogenic pressure: change tank"
IDERROR113. "Replace front cover"
IDCOMMERR0. "HP7680A fatal error: perform full reset"
IDCOMMERR1. "HP7680A received command out of order"
IDCOMMERR2. "Invalid parameter detected in command"
IDCOMMERR3. "Outside cover not installed"
IDCOMMERR4. "Insufficient tank pressure"
IDCOMMERR5. "No sample thimble in extraction chamber"
IDCOMMERR6. "Extraction chamber door open"
IDCOMMERR7. "No vial in turret location %d"
IDCOMMERR8. "System pressure low; current tank is %d"
IDCOMMERR9. "Cryogenic pressure low"
IDCOMMERR10. "Circuit board missing"
IDCOMMERR11. "Circuit board in wrong slot"
IDCOMMERR12. "Dispenser pump broken"
IDCOMMERR13. "Dispenser mechanism broken"
IDCOMMERR14. "Vial turret broken"
IDCOMMERR15. "Vial needle carriage broken"
IDCOMMERR16. "Liquid leak detected in base"
IDCOMMERR17. "Chamber broken"
IDCOMMERR18. "System overpressure condition"
IDCOMMERR19. "Thermal control system broken"
IDCOMMERR20. "HP7680A not responding"
IDCOMMERR21. "Start keypress disallowed at this time"
IDCOMMERR22. "No tray present"
IDCOMMERR23. "System cannot be in a run"
IDCOMMERR24. "Chamber is not closed"
IDCOMMERR25. "OPEN disallowed; system pressurized"
IDCOMMERR26. "Depressurization timeout"
IDCOMMERR27. "Pressure isolation valve malfunction"
IDCOMMERR28. "Chamber overpressure condition"
IDCOMMERR29. "Pump pressure transducer is defective"

The data and time are added to the event to form an event line which is written to the logfile at step 106. Each subsequent event line is similarly written to the logfile until the application has been completed or terminated as shown by step 108.

A series of logfiles are preferably stored on the computer's hard disk or other storage means. The stored logfiles preferably comprise current operations and extend backward in time to archive all instrument activity within the limits of the available disk space. As well known to those skilled in the art, any storage media capable of storing computer data, such as magnetic tape or floppy disk, could be used instead of hard disk storage media. At step 110 the current logfile is thus archived on any medium capable of storing computer data. The logfile is "archived", since it resides on the disk from the time it was created at step 102. In preferred embodiments, the logfile is printable from the instrument application programs shown by step 112.

As shown by the dashed line in FIG. 4, printing of the logfile may be performed at any time the application program is running. The ability to print at any given time is important since the verification procedures described below require that the application program is running. This would not be true if the only access to the print step 112 were through the application termination step 108.

Several tests are performed to detect errors and tampering. Most applications programs are run on an unsecured system, for instance, using the environment of the extraction instrument application which is preferably based upon Microsoft Corp. WINDOWS ™. The self-documenting logfile software of the present invention detects accidental and inadvertent erasure as well as some tampering attempts. Such alterations of the logfile are likely to result from the application program's intended users rather than from unauthorized persons.

Table 2 presents a summary of the tests used for detecting errors and tampering of logfiles generated by the extractor instrument application program.

TABLE 2

Figure 5:
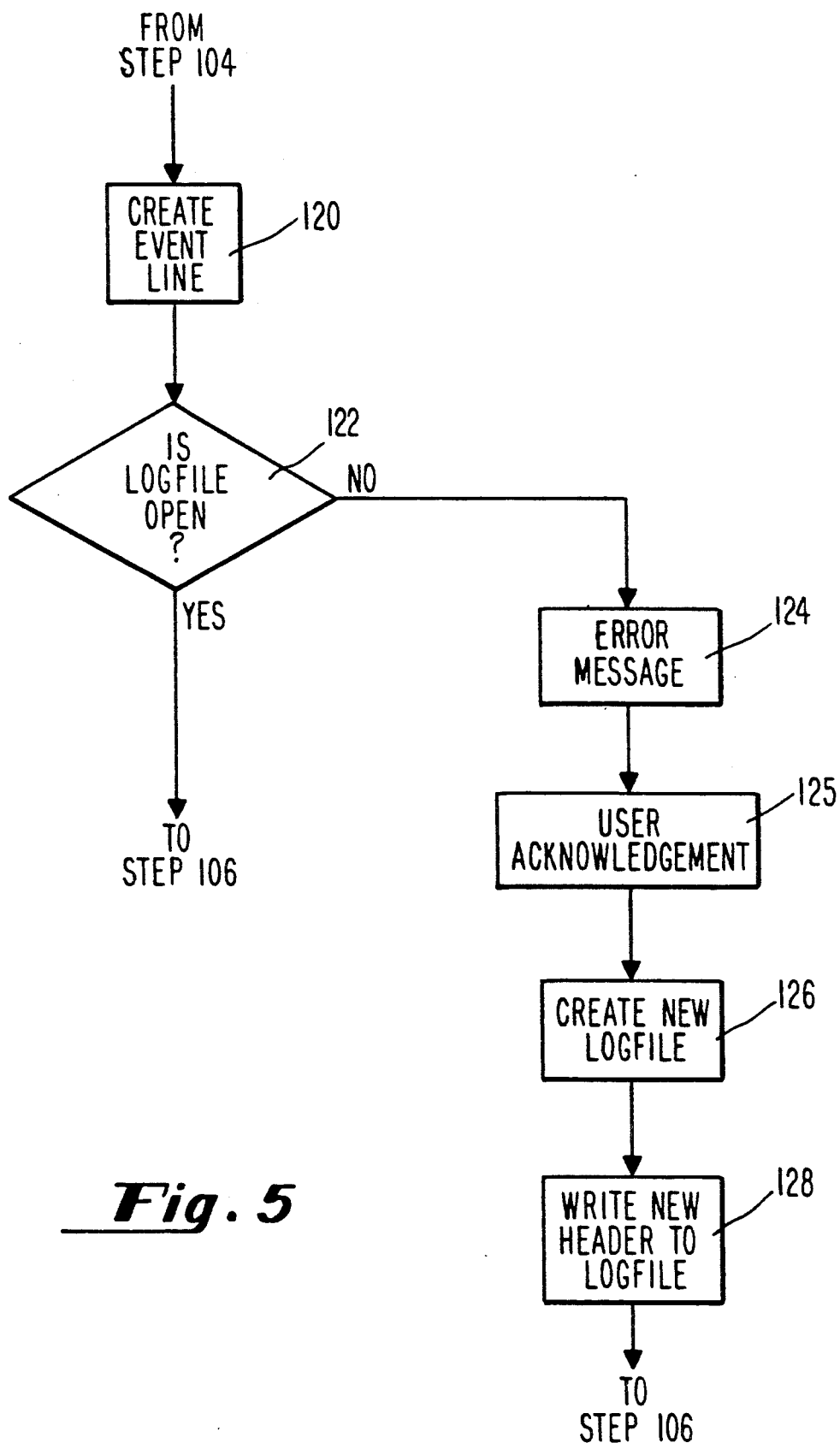
FIG. 5 is a functional flow diagram of the logfile verification procedure during the application.

| Tests | Result of Error | Error at FIG. 4 Step |
|---|---|---|
| Verify that logfile can be created | Application terminated | 102 |
| Verify that logfile can be opened | See FIG. 5 | 106 |
| Minimum Characters | "Empty" Message | 114 |
| Header Presence | "Invalid File" Message | 114 |
| Special Characters | "Invalid Data" Message | 114 |
| Non-printing Characters | "Invalid Data" Message | 114 |
| Maximum Characters | "Corrupt Data" Message | 114 |

If a logfile cannot be created at step 102, an error message is sent to the user and the application is terminated. Such a situation might occur, for example, when there exists a serious computer system failure or if no disk space is available.

As would be understood by those skilled in the art, the logfile must also be opened before each event line is written. If the logfile cannot be opened, the procedure shown in FIG. 5 is executed. As shown, the event line is created at step 120. If the logfile can be opened as determined by step 122, then the event line is written to the logfile as described by step 106 in FIG. 4. However, if the logfile cannot be opened, an error message is generated and displayed to the user at step 124. After the user acknowledges the error at step 125, a new logfile is created at step 126. The start up event line will also be written to the new logfile at step 128. This event line will differ from the original event line, not only by indicating the application, but also by specifying that the application program started at an unknown time and that some information may have been lost. Once the new start up event line is written to the new logfile, the application program may continue and the self-documenting logfile software continues with step 106 shown in FIG. 4.

When the user chooses to print a logfile, several other tests are also preferably performed, as listed in Table 2. If the file is unusually small, an error is displayed indicating that the file is "empty". This determination can be made because a minimum number of characters are written to the file immediately after creation and fewer characters than the minimum number have been found.

Figure 6:
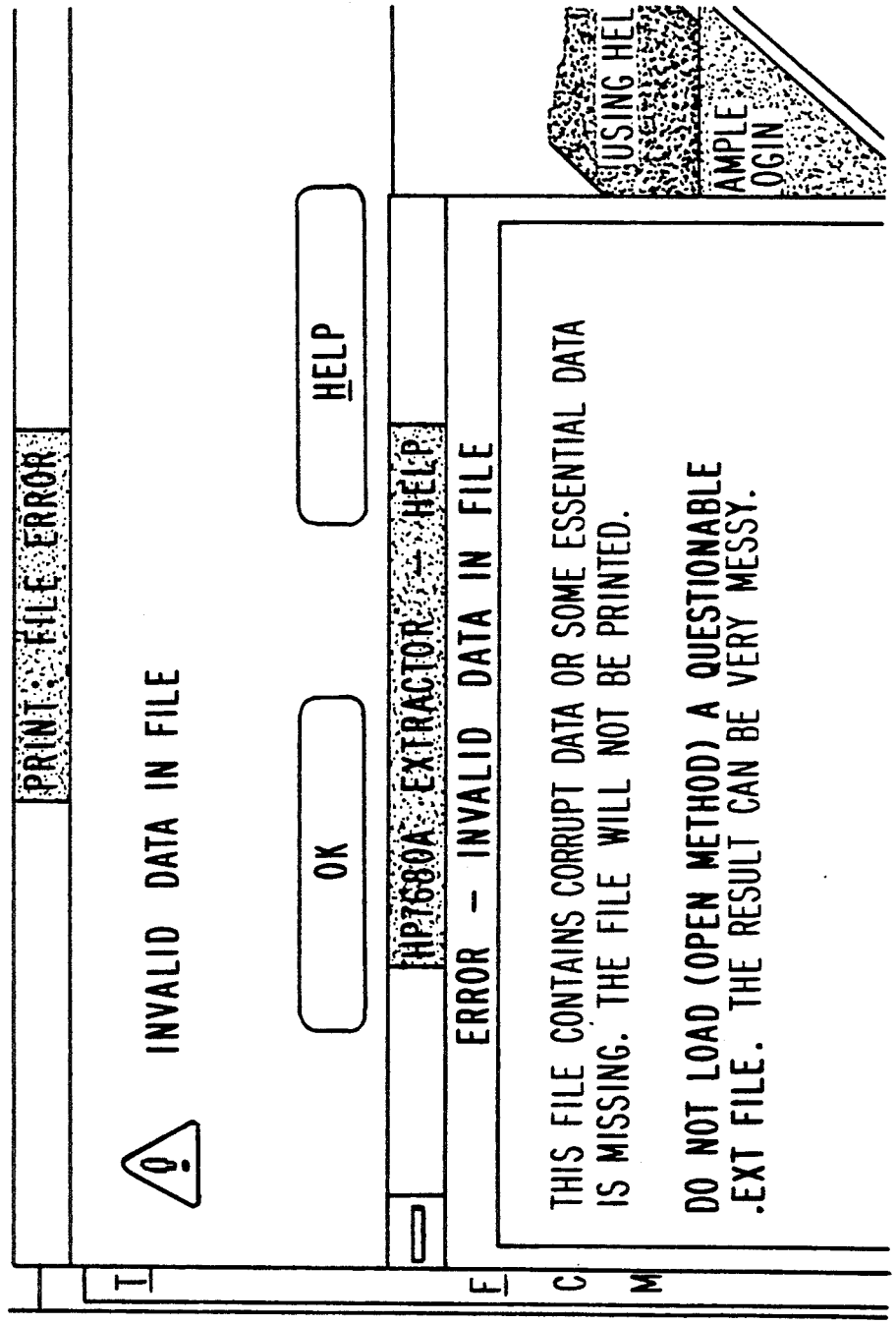
FIG. 6 shows and "Invalid Data" error display.

Another test checks the beginning of the logfile for the presence of a start up event line indicating which application program has been selected. If this text is not found, a message is communicated to the user, indicating that the file is invalid. Further tests are preferably made of the logfile contents when printing the logfile. For instance, a search may be made for any non-printing characters, as might arise from inclusion of an executable file. Also, a user could unintentionally rename the logfile as an executable file or execution lines could inadvertently be appended to the logfile via the user or a faulty computer operating system or hardware. Additional tests are made for various special characters, such as the "newline", EOF (end of file), null and other formatting characters which are known to those skilled in the art. Only certain special characters or combinations of special characters are permitted characters within the logfile. If a non-printable character or impermissible special characters are found within the logfile, an invalid data message is posted for the user, as shown in FIG. 6.

Figure 7:
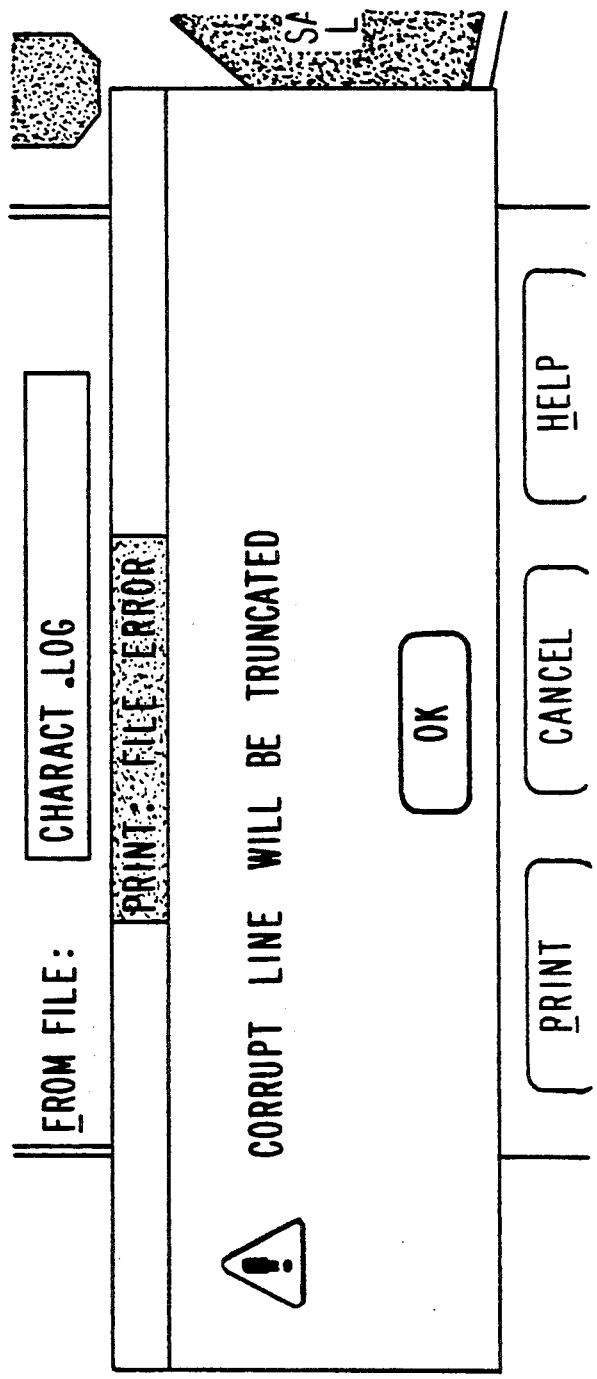
FIG. 7 shows a "corrupt line will be truncated" message display.

As the logfile is printed, each event line is preferably checked for length. An event line is preferably limited to a predetermined length; if the number of characters within an event line exceeds the maximum allowable number of characters, a message is displayed for the user indicating that the "corrupt line will be truncated." An example of this message is shown in FIG. 7. Such a situation may arise, for example, from file transcription errors.

As would be readily understood by those of ordinary skill, a logfile could be retrieved by a user for on-line review as one alternative to printing out the logfile for review. The same tests are preferably provided for on-line review of the logfile. Additionally, other tests could be provided to verify the validity of the logfile contents, such as testing the event lines for chronological order.

Another aspect of the present invention is the verification of the logfile contents. The contents of the logfile is examined to generate an enciphering key, which can be changed from time to time. This key can be used, for example, to subtly modify the contents of successive lines in the logfile. When the logfile is retrieved for verification and printing, alterations are detected with a known probability. Thus, choice of an appropriate enciphering algorithm can make the detection of tampering almost a certainty.

For example, if an unchanging "key" is used that requires all lines to contain an even number of characters, half of the event lines, on average, will fulfill this requirement. Those that do not could have an extra character inserted or added before entry into logfile. When verifying, any line with an odd number of characters results from a transcription failure or tampering. The naive tamperer will have a 50% probability of entering an even line and succeeding with no effort. Minimum effort will show that all valid lines are even and the 'key' rendered ineffective. A more effective procedure can use a 'key' with more than two states, or a 'key' that changes from time to time, or both. A key with more states can be achieved by using other attributes of the event line, such as the number of characters of certain types; the space character and the non-printing characters. A fixed 'key' using three character positions could defeat more than 90% of naive tampering attempts by rejecting individual lines that have been added or altered; deducing such an algorithm would be difficult for the novice.

The event lines created by the present invention contain information that changes considerably from line to line. If this changing information is used to modify the 'key' from time to time, the 'key' represents a moving target which is individualized for the entire logfile. This extends the verification process from individual lines, which are passed or rejected, to the entire file. When the entire file is enciphered, little intrusion is needed on each individual line and a simple, secure, preferably secret cipher can be efficiently executed. Naive tampering attempts could be detected at a discouragingly high probability so even those skilled in the art would likely direct attempts to compromise the system down easier avenues.

To better understand the present invention, a working example is provided to demonstrate the self-documenting logfile procedure during an extraction instrument application where an error condition involving a missing vial exists. Referring to FIG. 8, a sample logfile is shown. The start up event line 130 includes the minimum number of characters 131. The event lines 132 show the application steps taken for an analytical experiment. The "no vial in turret location 1" message 134, is displayed on the user's monitor as shown in FIG. 9.

Figure 9:
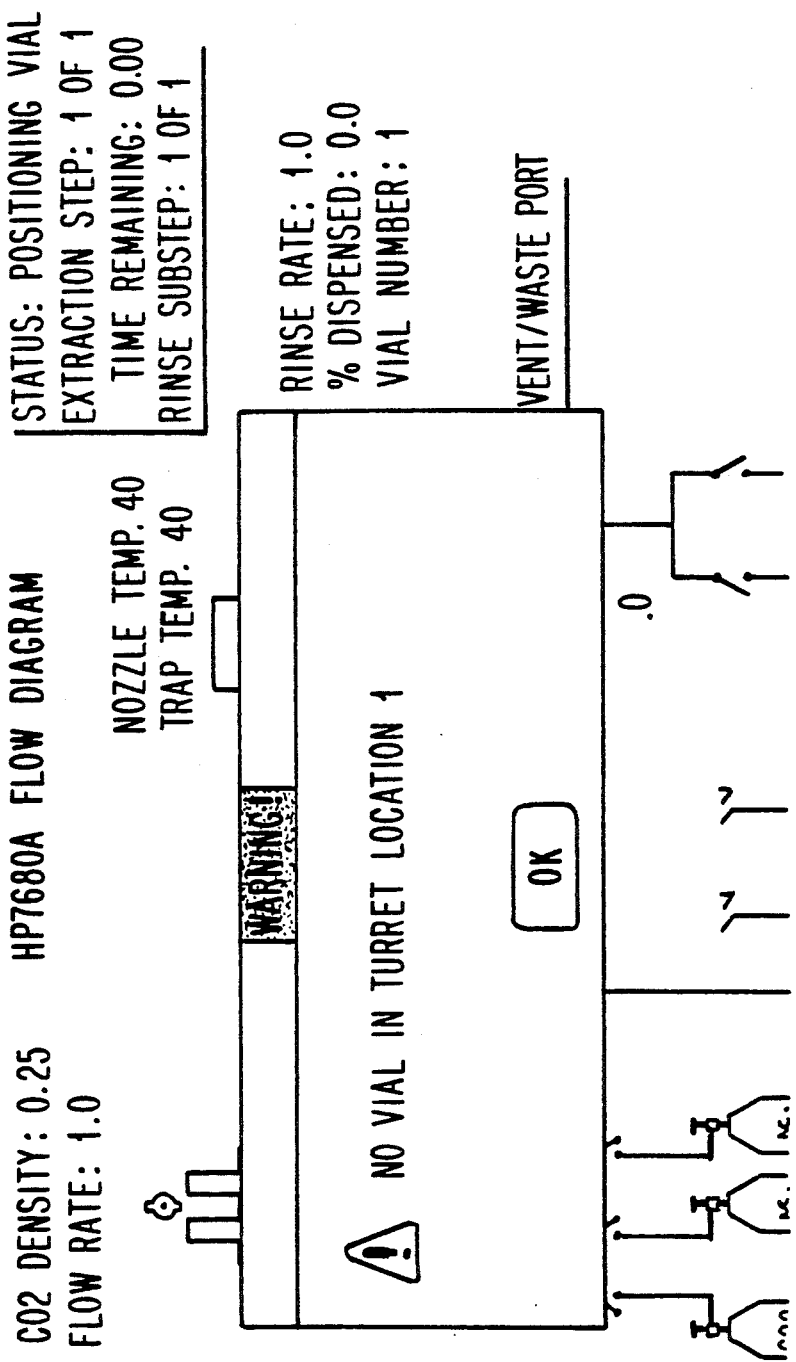
FIG. 9 shows an example of an error display during extractor activity.
Figure 10:
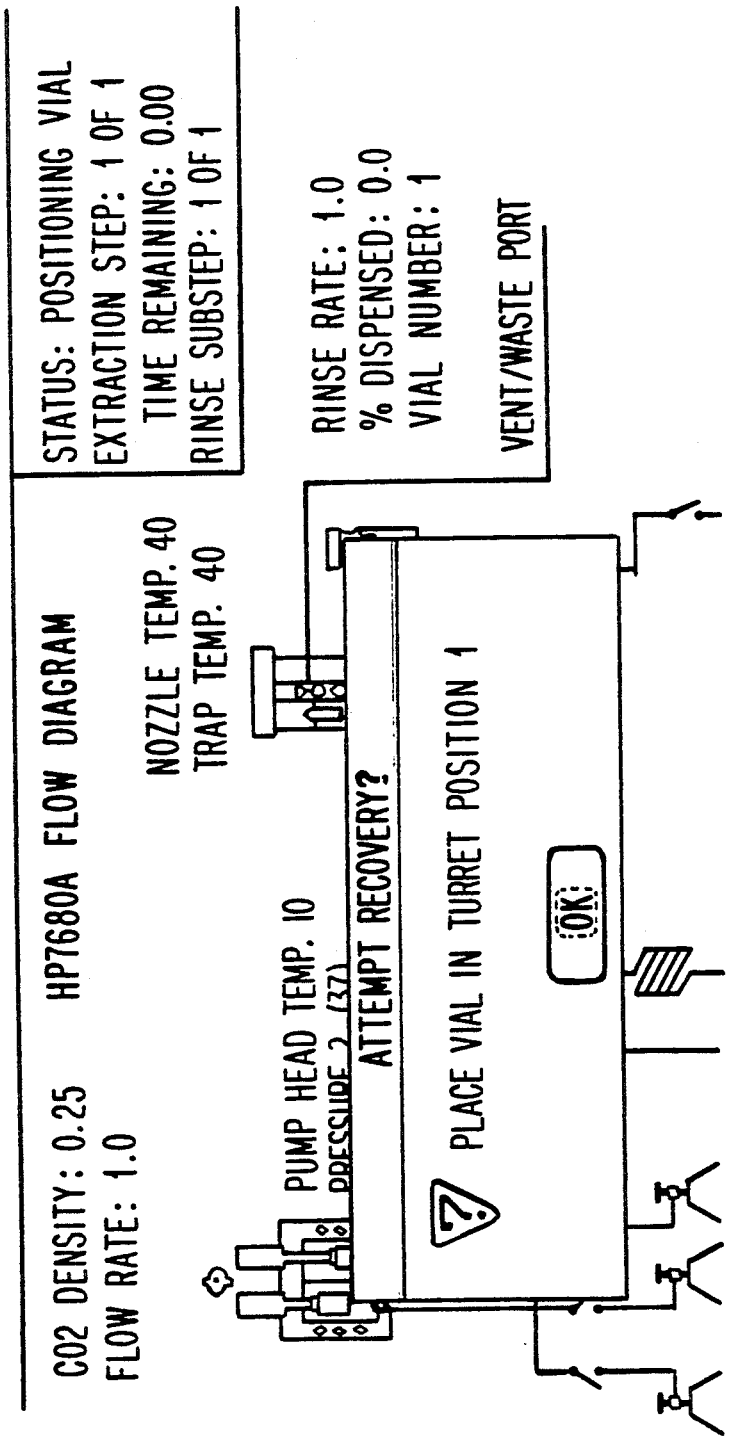
FIG. 10 shows an example of a user instruction display during extractor activity.

The user acknowledges this message by selecting the "OK" displayed with the message shown in FIG. 9. The user then receives the message shown in FIG. 10, which is also written to the logfile in event line 136.

The message directs the user to place a vial in turret position 1, after which the user selects the "OK" to continue. It should be noted that the "OK" is also written to event line 136 so that on review of the logfile it can be verified that the user had acknowledged correcting the missing vial error. The application then continues normally, as shown by event lines 138.

It will be appreciated that the techniques described above may be readily adapted to provide self-documenting logfiles in many different types of computer-controlled apparatus. The descriptions set forth above relate mainly to analytical instruments and the Good Laboratory Practice (GLP) associated therewith. Those of skill in the art will realize, however, that any computer-controlled instrument can be adapted to utilize the present invention and such use will be governed by appropriate standards which supplement GLP for other types of instruments or devices. The present invention provides methods whereby a record of the inputs and operating conditions of an instrument are recorded and evaluated to determine if the instrument is operating properly. Thus, the present invention will find wide applicability beyond the specific instruments and computer code described herein.

Therefore, although the present invention has been described and illustrated with reference to specific embodiments, those skilled in the art will recognize that modification and variations may be made without departing from the principles of the invention as described herein above and set forth in the following claims.

What is claimed is:

1. A method for maintaining a self-documenting logfile in a computer said logfile being automatically updated without intervention by a user and recording information indicative of a status of a substantially computer-controlled device having one or more application programs, the method comprising the steps of:
   (a) accepting one or more input commands from a user;
   (b) monitoring device characteristics indicative of the status of the device;
   (c) detecting an event upon occurrence of at least one of:
      (i) a deviation in the device status,
      (ii) a procedural step occurring while the device is in operation,
      (iii) a user input in response to said deviation in the device status,
      (iv) a user input initiating said deviation in the device status, and
      (v) a user input initiating a procedural step while the device is in operation;
   (d) writing an indication of the event to said logfile together with a record of at least the time and date of the event, thereby creating an event line;
   (e) archiving said logfile on to a means for storing data;
   (f) retrieving said logfile upon user demand;
   (g) verifying said one or more input commands by determining whether the input commands meet an acceptability criteria and detecting inadvertent alteration of said logfile; and
   (h) formatting the logfile with a start up event line before an event line is written to the logfile, the start up event line being indicative of an application program selected by the user for controlling at least one of the device characteristics.

2. The method of claim 1, further comprising the step of informing the user of an error if the creation of said logfile fails.

3. The method of claim 1, wherein the step of verifying the user input and detecting inadvertent alteration further comprises a method of testing said logfile for validity comprising:
   (a) determining whether a minimum number of characters are present in the logfile; and
   (b) informing the user that the logfile is substantially empty if the minimum number of characters are not present in the logfile.

4. The method of claim 1, wherein the step of verifying the user input commands and detecting inadvertent alteration to the logfile further comprises a method of testing said logfile for validity comprising:
   (a) verifying that the start up event line is present in the logfile; and
   (b) informing the user that the logfile contains invalid data if the start up event line is not present.

5. The method of claim 1, wherein the step of verifying user input commands and detecting inadvertent alteration to the logfile further comprises a method of testing said logfile for validity comprising:

(a) testing characters within said logfile for impermissible characters and impermissible combinations of characters; and (b) informing the user that data within the logfile is invalid provided that at least one of the impermissible characters and the impermissible combinations of characters are present.

6. The method of claim 1, wherein the step of verifying the user input commands and detecting inadvertent alteration to the logfile further comprises a method of testing said logfile for validity comprising:

(a) determining whether one or more of the characteristics within the logfile are non-printable characters; and (b) informing the user that characters within the logfile are invalid if non-printable characters are present.

7. The method of claim 1, further comprising the step of storing the retrieved logfile in a form which can be printed upon user instruction.

8. The method of claim 1, wherein the device is a supercritical fluid extractor.

9. The method of claim 1, further comprising the step of substantially continuously verifying the presence of said logfile during the operation of the application program, wherein the verifying step comprises the steps of:

(a) opening the logfile and displaying a message informing the user if said logfile cannot be opened;

(b) accepting an acknowledgement input from the user, the input being indicative of a response to the message that the logfile cannot be opened; and (c) creating a new logfile.

10. The method of claim 9, wherein the new logfile comprises an alternate start up event line indicative of the application program further comprising information indicating that event lines may have been lost.

11. The method of claim 1, wherein the step of verifying the user input commands and detecting inadvertent alteration to the logfile further comprises a method of testing said logfile for validity comprising:

(a) determining whether a maximum number of characters within each event line is exceeded; and (b) informing the user that the event line exceeds the maximum number of characters.

12. The method of claim 11, further comprising the steps of storing the retrieved logfile in a form which can be printed upon user instruction.

13. The method of claim 12, further comprising the step of truncating the event line during printing if the event line exceeds the maximum number of characters.

14. The method of claim 1, further comprising a method of detecting tampering comprising the step of generating an enciphering key, whereby said enciphering key permits the detection of tampering attempts.

15. The method of claim 14, wherein the step of generating an enciphering key comprises modifying the event lines to have a regular characteristic, and the detection of tampering attempts comprises the step of determining if any of the event lines comprising the logfile do not possess the regular characteristic.

16. The method of claim 15, wherein the step of modifying the event lines comprises ensuring that each event line contains the same number of characters.

17. The method of claim 15, wherein the step of modifying the event lines comprises ensuring that each event line contains an even number of characters.

18. The method of claim 15, wherein the step of modifying the event lines comprises ensuring that each event line contains an odd number of characters.

19. The method of claim 15, wherein the step of modifying the event lines comprises ensuring that each event line contains one or more particularly selected characters.

20. The method of claim 15, wherein the step of modifying the event lines is changed on a regular basis.

21. A method for maintaining a self-documenting logfile in a computer said logfile being automatically updated without intervention by a user and recording information indicative of a status of a substantially computer-controlled device having one or more application programs, the method comprising the steps of:

(a) accepting one or more input commands from a user;

(b) monitoring device characteristics indicative of the status of the device;

(c) detecting an event upon occurrence of at least one of:
  (i) a deviation in the device status,
  (ii) a procedural step occurring while the device is in operation,
  (iii) a user input in response to said deviation in the device status,
  (iv) a user input initiating said deviation in the device status, and
  (v) a user input initiating a procedural step while the device is in operation;

(d) writing an indication of the event to said logfile together with a record of at least the time and date of the event, thereby creating an event line;

(e) archiving said logfile on to a means for storing data;

(f) retrieving said logfile upon user demand;

(g) verifying said one or more input commands by determining:
  (i) whether the input commands meet an acceptability criteria,
  (ii) whether inadvertent alteration to said logfile has occurred, and
  (iii) whether said logfile is valid;

(h) formatting the logfile with a start up event line before an event line is written to the logfile, the start up event line being indicative of an application program selected by the user for controlling at least one of the device characteristics;

(i) informing the user of an error if creation of said logfile fails; and (j) verifying the presence of said logfile while an application program is operating, wherein the verification comprises:
  (i) opening the logfile and informing the user if said logfile cannot be opened;
  (ii) accepting an acknowledgement input from the user, the input being indicative of a response to the information that the logfile cannot be opened; and
  (iii) creating a new logfile, wherein the new logfile comprises an alternate start up message indicative of the application program initiated at an unknown time and further indicating that event lines may have been lost.

22. The method of claim 21, wherein the device is a supercritical fluid exterior.

* * * * *